3,573,292
NOVEL OXYGEN COMPLEXES AND PROCESS FOR THE PRODUCTION THEREOF

Gunther Wilke, Paul Heimbach, and Herbert Schott, Mulheim (Ruhr), Germany, assignors to Studiengesellschaft Kohle mbH., Mulheim (Ruhr), Germany
No Drawing. Filed Dec. 15, 1967, Ser. No. 690,764
Claims priority, application Germany, Dec. 17, 1966, St 26,261
Int. Cl. C07f *15/00, 15/02, 15/04*
U.S. Cl. 260—242          17 Claims

ABSTRACT OF THE DISCLOSURE

Zero-valent complexes of Group VIII metals, oxygen and an electron donor such as, for example, a Group V metal trivalent compound, e.g., triphenyl phosphine; production of such zero-valent complexes by reacting a zero-valent compound of a Group VIII metal and an electron donor with molecular oxygen, preferably at a temperature of about —100 to about 75° C. These complexes can be used as oxygen transfer agents and for the preparation of finely divided, highly active metals of Sub-group VIII of the Periodic Table.

---

This invention relates to novel oxygen complexes and a process for the production thereof.

Processes for the preparation of complexes of transition and electron donors are known.

It has now been found surprisingly that it is possible to produce complexes of zero-valent metals of Sub-group VIII of the Periodic Table which contain oxygen as ligands.

The process according to the invention comprises reacting complexes consisting of zero-valent metals of the VIIIth Sub-group and electron donors with molecular oxygen. The complexes prepared in accordance with the invention are novel compounds.

For example, tetrakis(triphenyl-phosphine)nickel(O) in suspension reacts in accordance with the invention with molecular oxygen at as low as —80° C. In this reaction, two triphenyl phosphine molecules are displaced from the nickel atom and a complex in which two molecules of triphenyl phosphine and one molecule of oxygen are bonded to nickel (O) is obtained according to the equation:

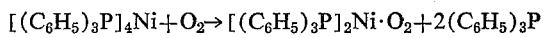

this product being capable of being isolated. This compound is stable up to about —35° C. Above this temperature, it decomposes spontaneously with transfer of the oxygen activated by complex formation to the triphenyl phosphine molecules which are present at the same time. The reaction product obtained is triphenyl phosphine oxide in addition to highly active nickel.

It is possible in an entirely analogous manner to prepare oxygen complexes of the other transition metals of Sub-group VIII, e.g. bis(triphenyl - phosphine)Pd·$O_2$, bis(triphenyl - phosphine)Pt·$O_2$, bis(trihexylphosphine) Co·$O_2$ or bis(triphenyl-phosphine)Fe·$O_2$.

The transition metals of Sub-group VIII of the Periodic Table, i.e. iron, cobalt, nickel, ruthenium, rhodium, palladium, osmium, iridium and platinum, are used in accordance with the invention. The use of the metals Ni, Pd and Pt is particularly advantageous. Suitable electron donors for complexing with the transition metals mentioned above and to be bonded in zero-valent state include compounds which have hetero atoms with free electron pairs and these compounds together with compounds which have multiple bonds with π-electron systems.

The compounds with hetero atoms which are chiefly used include alkyl, aralkyl, cycloalkyl and aryl compounds of the elements of main group V, i.e. of nitrogen, phosphorous, arsenic and antimony and amides of phosphorous acid, examples being triphenyl phosphine, tricyclohexyl phosphine, triisopropyl phosphine, triethyl phosphine, phosphorous acid tridiethylamide, phosphorous acid trimorpholide, triphenyl arsine, triphenyl arsenite triethyl arsine, triphenyl stibine, tripropyl stibine.

Suitable compounds with π-electron systems include those which contain CC—, CO—, CN multiple bonds and the combination thereof to conjugated multiple bonds, and derivatives thereof, examples being ethylene, cyclooctadi-1,5-ene, cyclododecatri-1,5,9-ene, phenyl acetylene, tolane, stilbene, cyclodoecyne, benzaldehyde, acrolein, cinnamic aldehyde, acrylonitrile, acrylic acid esters, sorbic acid esters, butadiene carboxylic acid esters, maleic anhydride, etc. The zero-valent metals are then combined in complexes in complexes in which both electron donors of the group first mentioned above and those of the second group are bonded.

Examples of zero-valent metal complexes with various electron donors include cyclooctadiene-nickel-(O)-bis(triphenyl phosphine), bis - triphenylphosphine - nickel-(O) - ethylene, bis(triphenylphosphine)nickel(O)stilbene, bis(triphenyl phosphine)nickel(O)tolane, bis(tricyclohexyl phosphine)nickel(O)ethylene, bis(tripiperidinophosphine)nickel(O)ethylene, bis(triphenyl phosphine) palladium(O)cyclooctadiene, bis(tricyclohexyl phosphine)platinum(O)ethylene and bis(triphenyl phosphine) nickel(O)butadiene.

The process according to the invention may be carried out in the presence and in the absence of solvents, but is preferably carried out in the presence of a solvent. Suitable solvents are those which neither attack the transition metal complexes to be used nor are themselves attacked by activated oxygen. Examples of suitable solvents include aliphatic, cycloaliphatic and aromatic hydrocarbons, ethers, esters such as hexane, cyclohexane, benzene, mixtures of saturated hydrocarbons (B.P. 60–200° C.), tetrahydrofuran, dioxane, diethyl ether. Mixtures of these solvents may also be used. The process according to the invention may be carried out at temperatures of from —100 to +75° C., especially from —80 to +50° C.

The novel complexes of zero-valent metals of Sub-group VIII of the Periodic Table which contain oxygen and electron donors as the only ligands are useful compounds in many respects.

First, they may be used for the transfer of oxygen. When decomposed, the complexes mentioned above, are converted into oxygen compounds of the donors bonded to the metal, i.e. the oxygen of the complex is transferred to the other ligand, which is the electron donor. So for example, decomposition of bis(triphenylphosphine) nickel(O).$O_2$ gives nearly pure triphenylphosphine-oxide.

In the same way, an excess of electron donor may be oxidized catalytically on the metal. For example, using as electron donors compounds having CN-multiple bonds like isonitriles, it is possible to transfer oxygen catalytically by the complexes mentioned above as catalysts to said electron donors, converting said electron donors into oxygen-containing compounds. Isonitriles are so converted into isocyanates, which are widely used in many fields, preferably in the production of plastics, foams.

Second, the new complexes many be used as starting materials for the preparation of finely-divided, high active metals of Sub-group VIII of the Periodic Table, which metals, preferably Pd, Pt and Ni, are well known catalysts for many purposes, because decomposition of the complexes gives metals of said complexes in a highly-active form.

EXAMPLE 1

35 grams of tetrakis(triphenyl phosphine)nickel in 350 g. of ether take up 1 g. of oxygen at $-78°$ C. Thereby, the red-brown tetrakis(triphenyl phosphine)nickel is converted into the yellow bis(triphenylphosphine)nickel (O)oxygen complex which is freed from concomitantly formed triphenyl phosphine by extraction with cold ether at $-78°$ C. If the pure compound which is suspended in ether is thereafter allowed to reach a temperature above $-35°$ C., decomposition occurs while the color turns brown. The elemental nickel may be removed from the resultant mixture by means of dilute hydrochloric acid. When evaporated, the ether solution leaves behind 17 grams of triphenylphosphine oxide, i.e. substantially 100% of the triphenyl phosphine bonded to the oxygen complex have been oxidized.

EXAMPLE 2

The oxygen complex of platinum is prepared, for example, by dissolving 5 g. of tetrakis(triphenylphosphine) platinum in 150 g. benzene and introducing oxygen at $20°$ C. until the solution is saturated, which takes about 1 hour with the quantities mentioned above. The yellow bis(triphenyl phosphine)platinum(O)-oxygen complex precipitates and is recovered in pure form after filtration and washing with benzene. Yield: 2.5 g.=85% of the theoretical.

EXAMPLE 3

The palladium-oxygen complex is prepared, for example, by dissolving 11.9 g. of tetrakis(triphenylphosphine) palladium(O) in 150 g. of benzene and introducing oxygen at $0°$ C. Within 15 minutes, 0.33 g. of $O_2$ are taken up. After filtration and washing with benzene, 6.0 g.=88% of the theory of bis(triphenyl phosphine) palladium(O)$\cdot O_2$ are obtained.

EXAMPLE 4

40.8 g. of bis(triphenyl phosphine)nickel(O)-stilbene suspended in 200 g. of ether take up 1.68 g. of oxygen at $-78°$ C. The resultant bis(triphenyl phosphine)nickel (O)$\cdot O_2$ is purified as described in Example 1. The yield is substantially quantitative.

EXAMPLE 5

Bis(triphenyl phosphine)nickel(O)$\cdot O_2$ may also be prepared when starting from bis(triphenylphosphine)nickel (O)tolane. A suspension of 15.56 g. of this complex in 100 g. of ether is prepared and treated with oxygen at $-78°$ C. (take-up, 0.64 g.). The product is purified as described in Example 1. The yield is substantially quantitative.

EXAMPLE 6

Bis(triphenylphosphine)nickel(O)$\cdot O_2$ is obtained directly in pure form by reacting the suspension of 22.6 g. of bis(triphenylphosphine)nickel(O)-ethylene in 150 g. of ether with 1.14 g. of oxygen at $-78°$ C. Yield, 22 g.

EXAMPLE 7

21.6 grams of bis(tricyclohexyl phosphine)-nickel(O) ethylene suspended in 250 g. of ether take up 1.10 g. of oxygen at $-78°$ C. 21 grams of bis(tricyclohexyl phosphine)nickel(O)$\cdot O_2$ in pure form are obtained.

EXAMPLE 8

Pure bis(tripiperidinophosphine)nickel(O)$\cdot O_2$ is obtained by introducing oxygen at $-78°$ C. into the suspension of 3.01 g. of bis(tripiperidinophosphine)nickel(O) ethylene in 35 g. of ether at $-78°$ C. Within about 1.5 hours, 0.15 g. of $O_2$ are taken up and 3.0 g. of the complex are formed.

EXAMPLE 9

3.06 grams of bis(triphenylphosphine)nickel(O)-cinnamic aldehyde suspended in 35 g. of ether take up 0.14 g. of oxygen at $-78°$ C. After filtration and washing with ether at $-78°$ C., the pure bis(triphenylphosphine)nickel(O)-oxygen complex remains.

When substituting corresponding electron donor complexes of the metals cobalt, iron, osmium, iridium, rhodium or ruthenium for the electron donor-nickel(O) complex mentioned in the examples, the corresponding oxygen complexes of these metals are obtained. Bis(trihexylphosphine) palladium(O) - $O_2$, bis(trihexylphosphine)cobalt(O)-$O_2$, and bis(triphenylphosphine)iron-(O)-$O_2$, for example, are manufactured according to this invention in this manner.

What is claimed is:
1. A process for the production of novel complexes of zero-valent metals of Sub-group VIII of the Periodic Table, oxygen, and two Group Va electron donor molecules which comprises reacting complexes consisting of zero-valent metals of Sub-group VIII and electron donors selected from the group consisting of two Group Va electron donor ligands and one multiple bonded carbon atom-containing electron donor ligand containing bondable II electrons or four Group Va electron donor ligands with molecular oxygen at $-100$ to $+75°$ C.

2. Process according to claim 1, wherein temperature of from $-80°$ to $+50°$ C. are used.

3. Process according to claim 1, wherein said Group VIII metal is at least one member selected from the group consisting of nickel, palladium and platinum.

4. Process according to claim 1 carried out in a solvent, which solvent is at least one member selected from the group consisting of aliphatic hydrocarbons, cycloaliphatic hydrocarbons, aromatic hydrocarbons, ethers and esters.

5. Process according to claim 1, wherein said multiple bonded carbon atom containing electron donor is at least one member selected from the group consisting of ethylene, cyclooctadi - 1,5-ene, cyclododecatri - 1,5-9-ene, phenyl acetylene, tolane, stilbene cyclododecyne benzaldehyde, acrolein, cinnamic aldehyde, acrylonitrile, acrylic acid esters, sorbic acid esters, butadiene carboxylic acid esters, and maleic anhydride.

6. A process as claimed in claim 1 wherein said Group Va electron donors are selected from the group consisting of triphenylphosphine, tricyclohexylphosphine, triisopropylphosphine, triethylphosphine, phosphorous acid tri(diethyl amide), phosphorous acid trimorpholide, triphenyl arsine, triethyl arsine triphenyl stibine and tripropyl stibine.

7. Complexes of zero-valent metals of Sub-group VIII of the Periodic Table with one oxygen molecule and two Group Va compound electron donor molecules each of which is selected from the group consisting of triphenyl phosphine, tricyclohexyl phosphine, triisopropyl phosphine, triethyl phosphine, phosphorous acid tri(diethyl amide), phosphorous acid trimorpholide, triphenyl arsine, triethyl arsine, triphenyl stibine and tripropyl stibine.

8. Complex claimed in claim 7, wherein said metal is at least one member selected from the group consisting of nickel, palladium and platinum.

9. Complex claimed in claim 7, wherein said metal is at least one member selected from the group consisting of iron, cobalt, ruthenium, rhodium, osmium and iridium.

10. Bis(triphenylphosphine)nickel(O)·$O_2$.
11. Bis(triphenylphosphine)platinum(O)·$O_2$.
12. Bis(triphenylphosphine)palladium(O)·$O_2$.
13. Bis(tricyclohexylphosphine)nickel(O)·$O_2$.
14. Bis(tripiperidinophosphine)nickel(O)·$O_2$.
15. Bis(trihexylphosphine)palladium(O)·$O_2$.
16. Bis(trihexylphosphine)cobalt(O)·$O_2$.
17. Bis(triphenylphosphine)iron(O)·$O_2$.

References Cited

Vaska (I): Science (Washington), vol. 145 (1964), pp. 920–1.

Vaska (II): J. Am. Chem. Soc. 88 (1966), pp. 5324–5.

TOBIAS E. LEVOW, Primary Examiner

A. P. DEMERS, Assistant Examiner

U.S. Cl. X.R.

75—.5; 260—270, 429, 439, 453, 606.5